(12) United States Patent
Chaturvedi et al.

(10) Patent No.: US 10,044,075 B2
(45) Date of Patent: Aug. 7, 2018

(54) PORTABLE ELECTRONIC DEVICE WITH ACCESSIBLE-CHARGE INDICATOR

(71) Applicant: Apple Inc., Cupertino, CA (US)

(72) Inventors: Nalin Chaturvedi, Union City, CA (US); Stephen D. Sterz, San Jose, CA (US); Soundararajan Manthiri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/263,088

(22) Filed: Sep. 12, 2016

(65) Prior Publication Data
US 2018/0076492 A1   Mar. 15, 2018

(51) Int. Cl.
| | | |
|---|---|---|
| *H01M 10/63* | (2014.01) | |
| *H01M 10/48* | (2006.01) | |
| *H01M 10/42* | (2006.01) | |

(52) U.S. Cl.
CPC ....... *H01M 10/488* (2013.01); *H01M 10/425* (2013.01); *H01M 2010/4278* (2013.01)

(58) Field of Classification Search
CPC .. H01M 10/63; H01M 10/425; H01M 10/443; H01M 10/486; H01M 10/488; H01M 2010/4278
USPC ...................................... 340/636.1
See application file for complete search history.

(56) References Cited

U.S. PATENT DOCUMENTS

| | | |
|---|---|---|
| 7,541,775 B2 | 6/2009 | Lee |
| 2008/0136653 A1* | 6/2008 | Owens ................. H02J 7/0047 340/636.1 |
| 2011/0264390 A1 | 10/2011 | Shabra |
| 2012/0025765 A1 | 2/2012 | Frey et al. |
| 2012/0075107 A1 | 3/2012 | Newman et al. |
| 2013/0043832 A1 | 2/2013 | Yen |
| 2013/0076366 A1 | 3/2013 | Arizono et al. |
| 2014/0068314 A1* | 3/2014 | Kim .................... G06F 1/3212 713/340 |

(Continued)

FOREIGN PATENT DOCUMENTS

EP     0915552     * 12/1998   ............... H02J 7/00

OTHER PUBLICATIONS

International Search Report and Written Opinion dated Nov. 7, 2017 in PCT/US2017/050902, 16 pages.

*Primary Examiner* — Steven Lim
*Assistant Examiner* — Mancil Littlejohn, Jr.
(74) *Attorney, Agent, or Firm* — Kilpatrick Townsend & Stockton

(57) ABSTRACT

An electronic device that displays a battery status is described. In particular, based on the occurrence or presence of an environmental condition (such as an extrinsic environmental factor and/or a current electronic-device usage factor), the electronic device may determine an inaccessible-charge condition of a battery in the electronic device. For example, the environmental condition may include: a temperature of the battery less than the temperature threshold value; and/or a discharge rate of the battery greater than the discharge threshold value. In response to the inaccessible-charge condition, the electronic device may display indications of two or more battery-charge parameters, including: an accessible battery charge, an inaccessible battery charge that is currently unavailable for use because of the environmental condition, and/or a total battery charge.

20 Claims, 8 Drawing Sheets

(56) References Cited

U.S. PATENT DOCUMENTS

2015/0069969 A1  3/2015  Wu et al.

* cited by examiner

PORTABLE ELECTRONIC DEVICE WITH ACCESSIBLE-CHARGE INDICATOR

FIELD

The described embodiments generally relate to power-management techniques. More specifically, the disclosure is directed to feedback techniques that display a battery status indicator, including two or more of a total amount of charge, an amount of the accessible charge and an amount of inaccessible charge.

BACKGROUND

Portable electronic devices are becoming increasingly popular, which has resulted in demand for improved performance and additional features. Most portable electronic devices are powered energy sources, such as batteries.

Batteries convert chemical energy into electrical energy to power a portable electronic device in various operational modes. A battery is typically designed to have a particular power, voltage, and current rating that relate to a capacity of the battery to supply charge to a portable electronic device during use. For example, lithium-ion batteries are popular among device manufactures because of their high energy density and low rate of self-discharge.

SUMMARY

Increases in usable battery capacity are desirable. Battery indicators that convey situation awareness to users, to facilitate increases in usable battery capacity, can be helpful. Conversely, inaccuracy of the current battery energy represented by the indicator can be frustrating to users. Consequently, battery indicators that convey sufficient information to increase usable battery capacity can enhance the user experience when using portable electronic devices.

Some embodiments that relate to an electronic device that displays a battery status. In particular, during operation the electronic device may determine an amount of accessible charge and an amount of inaccessible charge of the battery, where the amount of the inaccessible charge is based on at least on an extrinsic environmental factor and/or a current electronic-device usage factor. Then, the electronic device may display a first indication representing the amount of the accessible charge (or, alternatively, a total battery charge) and a second indication representing the amount of the inaccessible charge.

For example, the battery may have a temperature-dependent cell impedance that results in the inaccessible charge.

Moreover, the electronic device may display an icon representing the extrinsic environmental factor or the electronic-device current usage factor affecting the inaccessible charge. Furthermore, based on a determination that a temperature reading, obtained using a temperature sensor of (or associated with) the electronic device, is less than a temperature threshold value, the electronic device may display a first icon. Alternatively or additionally, based on a determination that the current electronic-device usage factor corresponds to a battery discharge rate greater than a discharge threshold value, the electronic device may display a second icon, which is different than the first icon.

Note that the extrinsic environmental factor may include an ambient temperature, and the electronic device may measure the ambient temperature using the temperature sensor of the electronic device.

In some embodiments, the electronic device displays a first numerical value of the accessible charge along with the first indication and a second numerical value of the inaccessible charge along with the second indication.

Moreover, the electronic device may compare a second numerical value of the inaccessible charge and a first numerical value of the accessible charge, where the second indication of the inaccessible charge is displayed based on the comparison.

Furthermore, the electronic device may receive a user input representing a request for additional information about the second indication representing the inaccessible charge. In response to the user input, the electronic device may display information specifying one or more applications executing on the mobile electronic device and numerical values of associated inaccessible charges, where the inaccessible charge associated with an application is based on current usage of electronic-device resources by the application.

Other embodiments provide another instance of the electronic device. This electronic device may include: a battery that powers the electronic device; a display that displays information; memory that stores information (such as a temperature threshold value and a discharge threshold value); and a processor. During operation, the electronic device may determine an inaccessible-charge condition of the battery based on a presence of an environmental condition, where the environmental condition includes: a temperature of the battery less than the temperature threshold value; and/or a discharge rate of the battery greater than the discharge threshold value. In response to the inaccessible-charge condition, the electronic device may display, on the display, a first indication of an accessible battery charge (or, alternatively, a total battery charge), and a second indication of an inaccessible battery charge that is currently unavailable for use because of the environmental condition.

Moreover, the electronic device may display, on the display, one of a set of icons that represents the environmental condition. For example, when the temperature of the battery less than the temperature threshold value, the electronic device may display a first icon and, when the discharge rate of the battery greater than the discharge threshold value, the electronic device may display a second icon, which is different than the first icon. Furthermore, the electronic device may display, on the display, a first numerical value of the accessible battery charge along with the first indication and a second numerical value of the inaccessible battery charge along with the second indication.

Additionally, the electronic device may compare a second numerical value of the inaccessible charge and a first numerical value of the accessible charge, where the second indication of the inaccessible charge is displayed based on the comparison.

In some embodiments, the electronic device: receives a user input representing a request for additional information about the second indication representing the inaccessible charge; and, in response to the user input, displays one or more applications executing on the mobile electronic device and numerical values of associated inaccessible charges, where the inaccessible charge associated with an application is based on current usage of electronic-device resources by the application.

Note that the battery may have a temperature-dependent cell impedance that results in the inaccessible charge.

Moreover, the electronic device may include a temperature sensor and the electronic device may measure the temperature of the battery using the temperature sensor.

Other embodiments provide a computer-program product for use with one of the instances of the electronic device. This computer-program product includes instructions for at least some of the aforementioned operations performed by the electronic device.

Other embodiments provide a method for displaying a battery status. The method includes at least some of the aforementioned operations performed by one of the instances of electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

An electronic device that displays a battery status is described. In particular, based on the occurrence or presence of an environmental condition (such as an extrinsic environmental factor and/or a current electronic-device usage factor), the electronic device may determine an inaccessible-charge condition of a battery in the electronic device. For example, the environmental condition may include: a temperature of the battery less than the temperature threshold value; and/or a discharge rate of the battery greater than the discharge threshold value. In response to the inaccessible-charge condition, the electronic device may display indications of two or more battery-charge parameters, including: an accessible battery charge, an inaccessible battery charge that is currently unavailable for use because of the environmental condition, and/or a total battery charge.

By displaying the indications of the battery-charge parameters, this feedback technique may provide more accurate feedback to a user about battery performance. The improved feedback may, in turn, improve the user's situational awareness about the battery performance, which may allow the user to adjust power usage and to set the user's expectations as to how much battery energy is currently available. Consequently, the feedback technique may reduce user frustration when using the electronic device in the presence of the environmental condition, and therefore may improve the user experience when using the electronic device.

In the discussion that follows, the electronic device includes or is sometimes referred to: a 'portable electronic device,' a 'mobile device,' a 'mobile electronic device,' a 'computing device,' a 'mobile computing device,' a 'consumer electronic device,' a 'wireless communication device,' 'mobile station,' 'wireless station,' 'station,' and 'user equipment.' These phrases may be used equivalently to describe electronic devices that may be capable of performing procedures associated with various embodiments of the disclosure. In the discussion that follows, a portable electronic device, such as a cellular telephone, is used as an illustration of the electronic device. However, the portable electronic device may include a variety of different electronic devices, such as: a laptop computer, a tablet computer, a music player, a mixed-media playback device, a smart-watch, a wearable device or monitor, a mobile hotspot device, a health monitoring device, etc.

Figure 1:
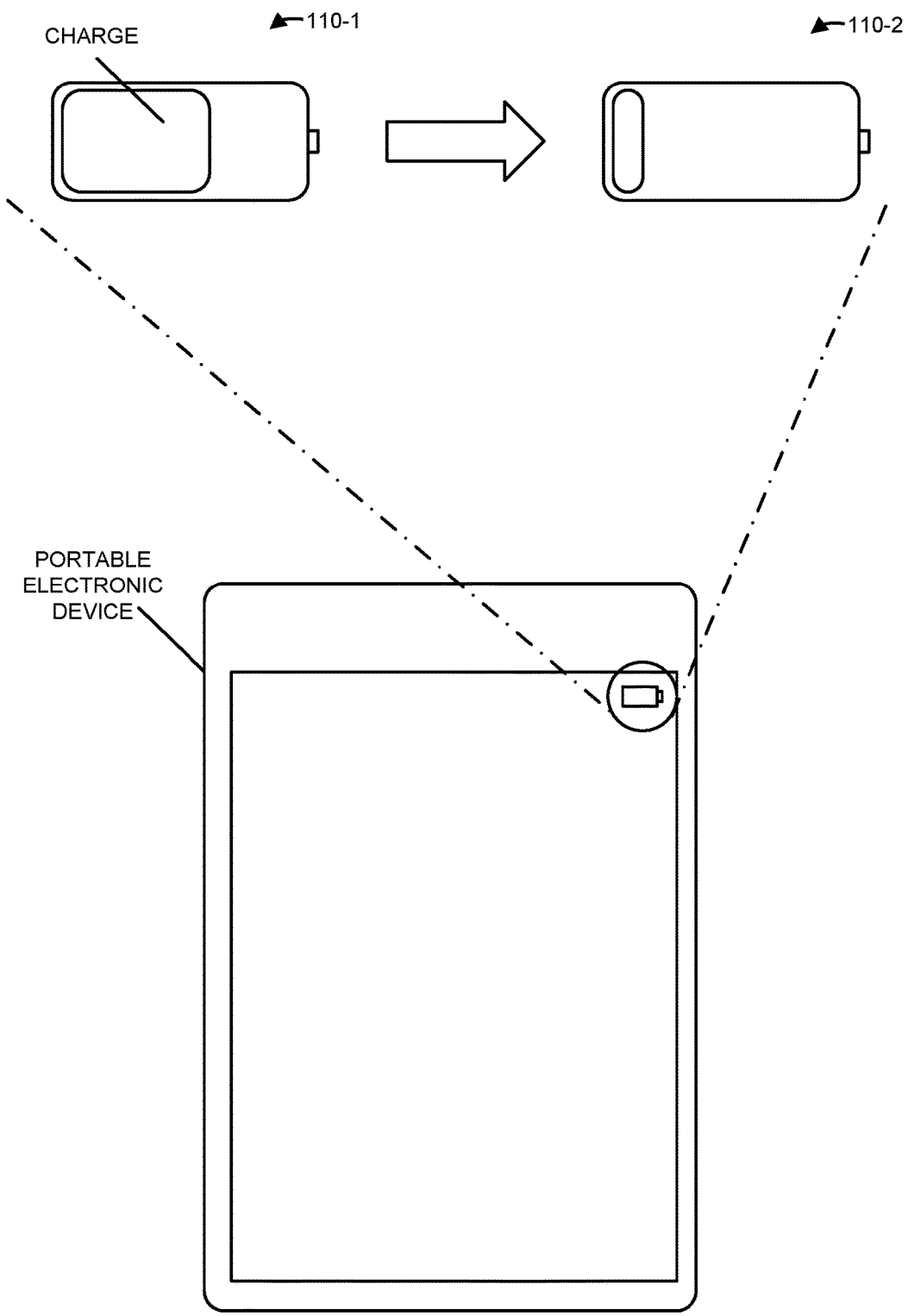
FIG. 1 is a drawing illustrating an example of a displayed battery status of a portable electronic device.
Figure 2:
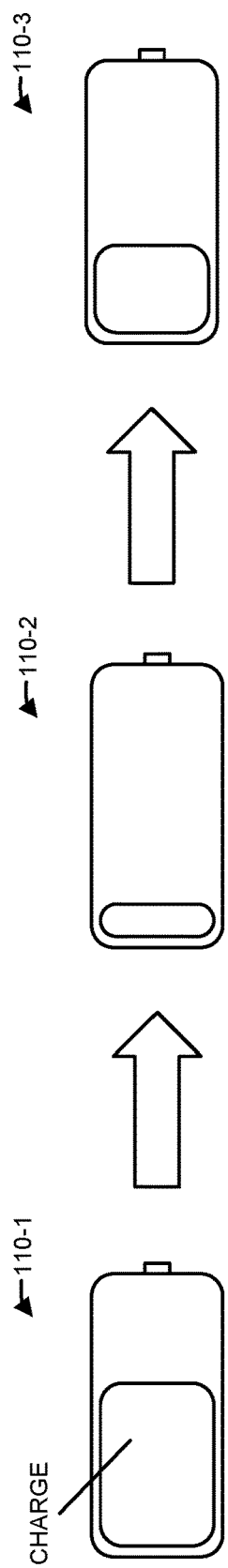
FIG. 2 is a drawing illustrating an example of a displayed battery status of a portable electronic device.

We now describe embodiments of the feedback technique. FIG. 1 presents a drawing illustrating an example of a displayed battery status of a portable electronic device, such as an available stored charge or energy in a battery in the portable electronic device. Initially, the displayed battery status 110-1 may indicate or suggest to a user that there is sufficient available energy in the battery. However, a short time later (e.g., 5 min), the user may move to a different environment (such as outside) where it is a cold winter day and/or while using one or more applications (e.g., with a moderate load). Alternatively or additionally, the user may start using one or more applications that significantly increase the load on the battery (and, thus, significantly increase the discharge current or power required from the battery). Under either or both of these circumstances, battery status indicator 110-2 may change and appear to suddenly indicate a significantly lower stored charge or energy of the battery. FIG. 2 illustrates an exemplary battery status of the portable electronic device where, after a few minutes of rest (e.g., 20 min) and/or a return to more favorable ambient conditions (such as indoors), battery-status indicator 110-3 changes again to indicate or suggest to a user that there is sufficient available energy in the battery.

These changes in the battery-status indicator may surprise users. Furthermore, the apparent inconsistent variation may undermine user trust in the battery-status indicator and, with it, in the portable electronic device. For example, users may conclude that there is an error or a bug in the energy-prediction software in the portable electronic device. Consequently, this variation in the battery-status indicator may adversely impact the user experience when using the portable electronic device.

As described further below, the reason for the variation in battery-status indicators 110 is because of an environmental condition, such as temperature and/or load-dependent impact on the power capability of the battery. In particular, because of the environmental condition, a portion of the stored charge in a battery may become inaccessible. However, subsequently, if the temperature increases and/or the battery discharge rate decreases, the accessible charge in the battery may increase. In order to address this variation, in the disclosed feedback technique, the portable electronic device may selectively (such as under appropriate environmental and/or load conditions where it is relevant) determine and display information (such as indicators or icons) that indicate or represent the amount of available charge and the amount of inaccessible charge. This information may be directly or indirectly specify the amount of available charge and the amount of inaccessible charge. For example, indicators displayed on the portable electronic device may represent the amount of available charge and the amount of inaccessible charge. Alternatively, indicators displayed on the portable electronic device may represent the total amount of charge and either the amount of accessible charge or the amount of inaccessible charge.

Thus, the feedback technique may provide a new way to show the battery status to users. In particular, the indicators displayed on the portable electronic device may inform users about how much charge (e.g., both accessible and inaccessible) remains in their battery. This information may improve the users' situation awareness about the impact of the environment and current usage on the available battery energy. Moreover, this situation awareness may enable user to take appropriate actions or to make appropriate decisions on how to manage/use the portable electronic device.

Consequently, the feedback technique may be intuitive, easy to use and informative, without requiring the average user to understand the inner workings of the battery and the underlying electro-chemistry that gives rise to the variation in the inaccessible charge. In addition, in some embodiments, the feedback technique includes one or more optional features for the more advanced and/or technically-savvy users, such as usage analysis and statistics for different applications executing on the portable electronic device. This additional information may assist the users in making informed decisions as to which (if any) applications to close in order to optimize battery usage.

Figure 3:
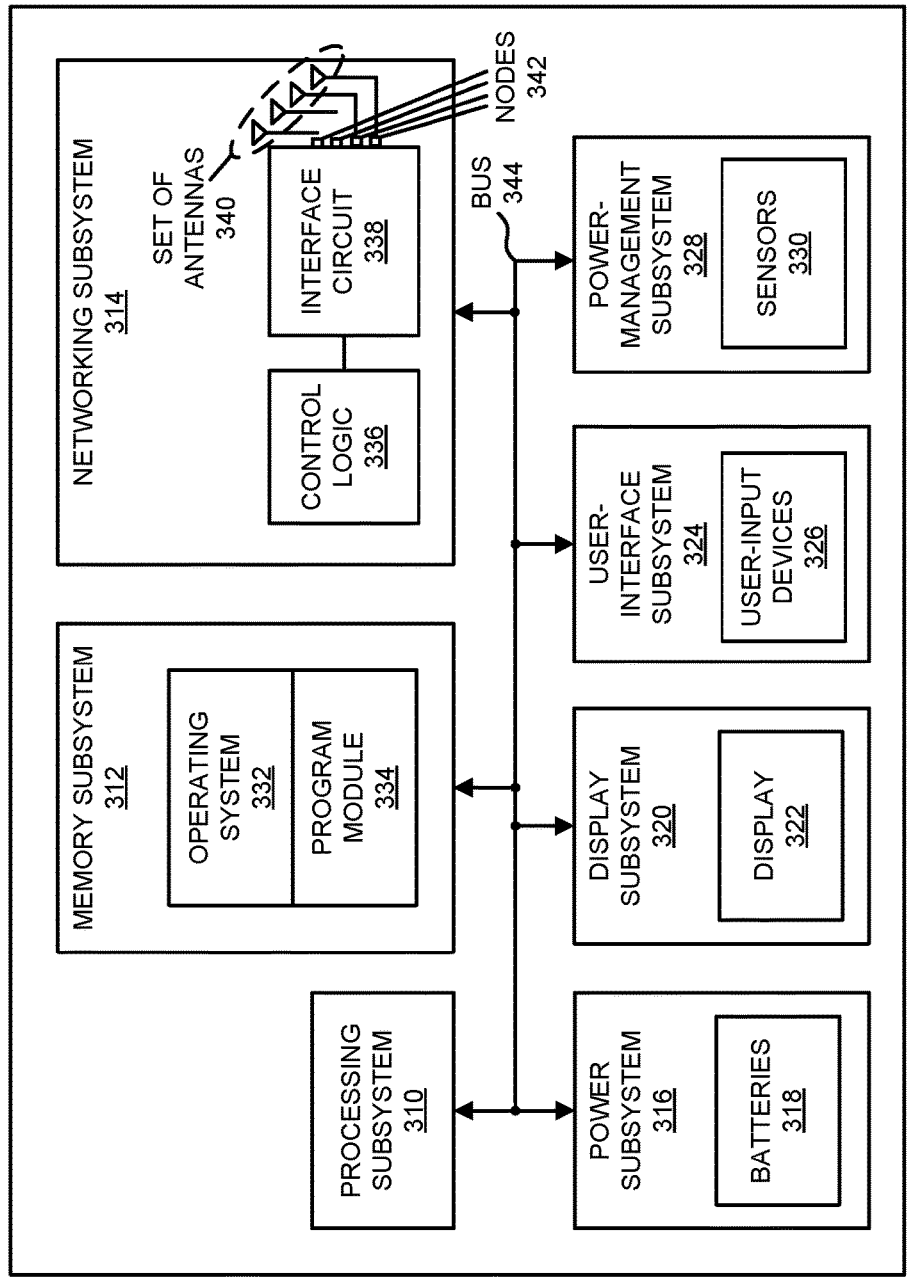
FIG. 3 is a block diagram illustrating an example of a portable electronic device.

FIG. 3 presents a block diagram illustrating an example of a portable electronic device 300 that implements the feedback technique. This portable electronic device may include processing subsystem 310, memory subsystem 312, networking subsystem 314, power subsystem 316, display subsystem 320, user-interface subsystem 324 (which allows a user to interact with portable electronic device 300, e.g., to provide user inputs) and power-management subsystem 328 (which performs measurements and assists in regulation or control of the power consumption of portable electronic device 300). Processing subsystem 310 includes one or more devices configured to perform computational operations. For example, processing subsystem 310 can include one or more microprocessors (such as central processing units or CPUs), graphical processor units (GPUs), application-specific integrated circuits (ASICs), microcontrollers, programmable-logic devices, and/or one or more digital signal processors (DSPs).

Memory subsystem 312 may include one or more devices for storing data and/or instructions for processing subsystem 310 and networking subsystem 314. For example, memory subsystem 312 can include dynamic random access memory (DRAM), static random access memory (SRAM), a read-only memory (ROM), flash memory, and/or other types of memory. In some embodiments, instructions for processing subsystem 310 in memory subsystem 312 include: one or more applications, program modules or sets of instructions (such as one or more program modules 332 or operating system 334), which may be executed by processing subsystem 310. For example, a ROM can store programs, utilities or processes to be executed in a non-volatile manner, and DRAM can provide volatile data storage, and may store instructions related to the operation of portable electronic device 300. Note that the one or more computer programs may constitute a computer-program mechanism or software. Moreover, instructions in the various modules in memory subsystem 312 may be implemented in: a high-level procedural language, an object-oriented programming language, and/or in an assembly or machine language. Furthermore, the programming language may be compiled or interpreted, e.g., configurable or configured, to be executed by processing subsystem 310. For example, a programming language configurable to be executed by processing subsystem 310 may complied so that it is configured to be executed by processing subsystem 310. In this discussion, configurable and configured may be used interchangeably. In some embodiments, the one or more computer programs are distributed over a network-coupled computer system so that the one or more computer programs are stored and executed in a distributed manner.

In addition, memory subsystem 312 may store information that is used in the feedback technique, such as: a temperature threshold value, a discharge threshold value, and/or historical average power consumption associated with one or more applications that may be executed by processing subsystem 310 and/or with one or more components in portable electronic device 300.

Power subsystem 316 may include one or more batteries 318 that power portable electronic device 300. For example, the one or more batteries 318 may power components in portable electronic device 300, such as processing subsystem 310. Note that the one or more batteries 318 may include any number of battery cells, which in turn may be connected in a parallel and/or series arrangement. Moreover, the one or more batteries 318 may include a wide variety of battery types and battery compositions.

While portable electronic device 300 is shown with particular components, there may be additional components, such as a camera, speakers, etc.), which may affect the power consumption of the portable electronic device 300 depending on whether these components are active or inactive. For example, a camera (e.g., a backward and/or a forward facing camera) may function in one or more operational modes having varying power consumption characteristics depending on settings associated with one or more of the applications. In some embodiments, the camera may operate in multiple, different operational modes, including, but not limited to including: an image burst mode, a video mode, and a photo mode (e.g., a still image capture mode). Each of these camera operational modes may have a distinct power consumption requirement of the one or more batteries 318 that uniquely affects the discharge current or energy rate.

Moreover, display subsystem 320 may display information on a display 322, which may include a display driver and the display, such as a liquid-crystal display, a multi-touch touchscreen, etc. Display subsystem 320 may be controlled by processing subsystem 310 to display information to a user. For example, display 322 may display one or indicators or icons associated with battery-charge parameters, such as an amount of accessible charge, an amount of inaccessible charge and/or a total charge of the one or more batteries 318.

Furthermore, user-interface subsystem 324 may include one or more user-input devices 326 (such as a keyboard, a mouse, a touchpad, a touch-sensitive display, a human-interface device, etc.) that allow a user of the portable electronic device 300 to interact with portable electronic device 300. For example, user-input devices 326 can take a variety of forms, such as: a button, a keypad, a dial, a touch screen, an audio input interface, a visual/image capture input interface, an input in the form of sensor data, etc. In particular, a user may use the one or more user-input devices 326 to provide one or more user inputs that are used to adjust or change information displayed on display 322 (such as information associated with the one or more indicators or icons), the application(s) executed by portable electronic device, etc. Note that in some embodiments display 322 is a touch-sensitive display that is included in display subsystem 320 and in the one or more user-input devices 326.

Additionally, power-management subsystem 328 may include one or more hardware or software sensors 330. For example, the one or more sensors 330 may include a temperature sensor that measures a temperature of the one or more batteries 318. Alternatively or additionally, the one or more sensors 330 may include a current senor that measures a discharge current from the one or more batteries 318, a voltage sensor that measures a voltage associated with the one or more batteries 318 and/or a power sensor that measures a discharge power from the one or more batteries 318.

During the feedback technique, processing subsystem 310 may execute one or more of the program modules 332 to display the battery status that includes intuitive information about battery-charge parameters. For example, processing subsystem 310 may access information stored in memory subsystem 312, such as the temperature threshold value and/or discharge threshold value. Then, processing subsystem 310 may compare measurements from the one or more sensors 330 to the temperature threshold value and/or discharge threshold value to determine if an environmental condition is present or has occurred. For example, because of a decrease in the temperature of the one or more batteries 318, an impedance of the one or more batteries 318 may increase, which may increase the amount of inaccessible charge.

Next, based on the comparison, processing subsystem 310 may determine the amount of accessible charge and/or the amount of inaccessible charge of the one or more batteries 318. Alternatively or additionally, the one or more sensors 330 may include an electronic circuit or circuitry that measures a state of charge (such as the amount of accessible charge and/or the amount of inaccessible charge of the one or more batteries 318), which is sometimes referred to as a "gas-gauge circuit" or a "fuel-gauge circuit." Note that the amount of accessible charge and/or the amount of inaccessible charge of the one or more batteries 318 may be determined based on a measured impedance of the one or more batteries 318, an inferred, estimated or indirectly calculated impedance of the one or more batteries 318 (such as based on the temperature of the one or more batteries 318 and a look-up table that maps temperature to impedance), a usage history of the one or more batteries 318 (such as a number of discharge/recharging cycles, which may impact the impedance and, thus. the inaccessible charge), a battery terminal voltage, a known shutdown voltage, and/or a discharge current (i.e., a current delivered to a load) of the one or more batteries 318.

Moreover, processing subsystem 310 may display, on display 322, one or more indications that represent battery-charge parameters, such as an amount of accessible charge, an amount of inaccessible charge and/or a total charge.

In some embodiments, if a user provides a user input to one or more of user-input devices 326, processing subsystem 310 may display additional information associated with the one or more indications on display 322, such as a numerical value of the amount of accessible charge, a numerical value of the amount of inaccessible charge, and/or information about one or more applications executing on portable electronic device 300 and numerical values of associated inaccessible charges (which may be based on measurements performed by the one or more sensors 330 and/or historical average power consumption values stored in memory subsystem 312).

Figure 4:
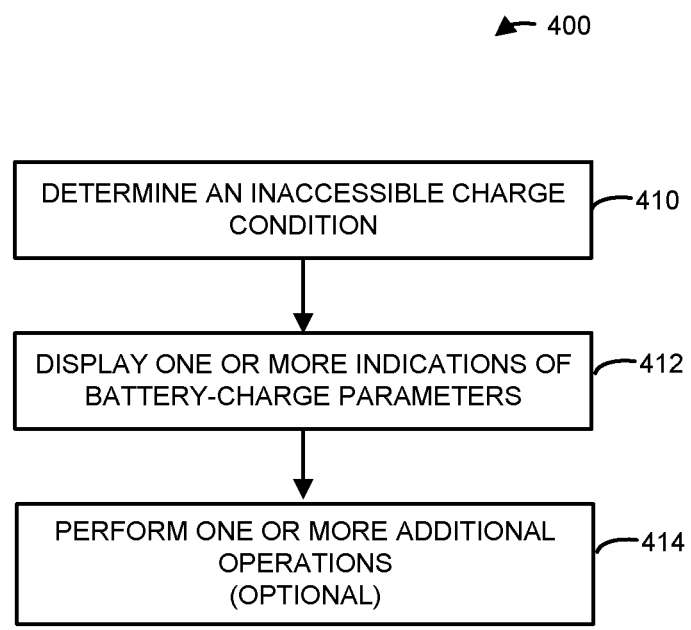
FIG. 4 is a flow diagram illustrating an example of a method for displaying a battery status using the portable electronic device in FIG. 3.

FIG. 4 presents a flow diagram illustrating an example of a method 400 for displaying a battery status using a portable electronic device, such as portable electronic device 300 (FIG. 3). For example, the operations in method 400 may be performed by control logic or a processor in the portable electronic device.

During operation, the portable electronic device may determine an inaccessible-charge condition (operation 410) of the battery based on a presence of an environmental condition, such as an extrinsic environmental factor and/or a current electronic-device usage factor. For example, the environmental condition may include: a temperature of a battery in the portable electronic device that is less than a temperature threshold value (i.e., the extrinsic environmental factor); and/or a discharge rate of the battery (e.g., in Amperes hours) that is greater than a discharge threshold value (i.e., the current electronic-device usage factor).

Note that determining the an inaccessible-charge condition may include determining an amount of accessible charge of the battery (which is sometimes referred to as an 'accessible charge' or an 'accessible battery charge') and an amount of inaccessible charge of the battery (which is sometimes referred to as an 'inaccessible charge' or an 'inaccessible battery charge'). In particular, the amount of inaccessible charge may be a result of the environmental condition and, thus, may be currently unavailable for use. For example, the battery may have a temperature-dependent cell impedance that results in the inaccessible charge, such as a cell impedance that increases with decreasing temperature. Alternatively or additionally, executing or running one or more applications on the portable electronic device may exceed a discharge rate or power of the battery.

Then, the portable electronic device may display one or more indications of battery-charge parameters (operation 412), including: a first indication of the amount of accessible charge, a second indication of the amount of inaccessible charge, and/or a third indication of the total battery charge (which is sometimes referred to as the 'total charge,' i.e. the sum of the amount of accessible charge and the amount of inaccessible charge. For example, as described further below with reference to FIG. 8, the portable electronic device may display a first icon (such as a graphical icon) representing the extrinsic environmental factor affecting the inaccessible charge. In particular, the portable electronic device may include a temperature sensor that measures the ambient temperature of the battery (i.e., may determine or obtain a temperature reading). When the temperature reading is less than the temperature threshold value (e.g., O C or near the freezing point of water), the portable electronic device may display the first icon.

Figure 9:
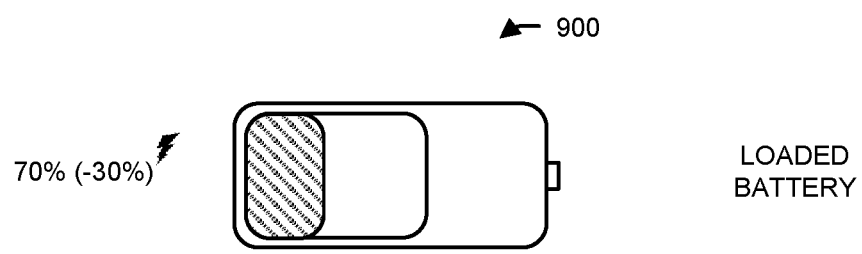
FIG. 9 is a drawing illustrating an example of a displayed battery status of the portable electronic device of FIG. 3.

Alternatively or additionally, as described further below with reference to FIG. 9, the portable electronic device may display a second (different) icon (such as another graphical icon) representing the electronic-device current usage factor affecting the inaccessible charge. In particular, the portable electronic device may include a current senor that measures a discharge current from the battery and/or a power sensor that measures a discharge power from the battery. (More generally, the portable electronic device may determine the current electronic-device usage factor, such as a battery discharge rate.) However, in some embodiments, instead of directly measuring the discharge current and/or the discharge power, the portable electronic device may indirectly infer the discharge current and/or the discharge power based on one or more applications executing on the portable electronic device (e.g., based on stored historical average current and/or power consumption associated with the one or more applications). When the discharge current and/or a discharge power is greater than the discharge threshold value, the portable electronic device may display the second icon.

Furthermore, the portable electronic device may display a first numerical value of the amount of accessible charge along with the first indication and/or a second numerical value of the amount of inaccessible charge along with the second indication. In general, the numerical value and/or the second numerical value may be absolute values or relative values (such as fractions or percentages). In some embodiments, the portable electronic device compares the second numerical value of the amount of inaccessible charge and the first numerical value of the amount of accessible charge, and the second indication of the amount of inaccessible charge is displayed based on the comparison (such as when the amount inaccessible charge exceeds a percentage of the total battery charge).

Additionally, the portable electronic device may optionally perform one or more additional operations (operation 414). For example, as described further below with reference to FIG. 10, the portable electronic device may receive a user input representing a request for additional information about the second indication representing the amount of inaccessible charge. This user input may include: activating a physical key in a user-interface device (such as a keyboard or a mouse), touching a touch-sensitive display within a strike area of a virtual icon, detecting a user gesture at a distance using wireless ranging, voice recognition based on a spoken command, tracking a direction of a user's gaze, and/or another user input (such as another user haptic input, another user sound, and/or another user body movement). In response to the user input, the portable electronic device may display information specifying one or more applications executing on the portable electronic device and numerical values of associated amount of inaccessible charge, where the amount of inaccessible charge associated with an application is based on current usage of electronic-device resources by the application (such as memory, an interface circuit, a CPU, a GPU, a display or a backlight, a user interface, a camera, etc.).

In some embodiments of method 400, there may be additional or fewer operations. Moreover, the order of the operations may be changed, and/or two or more operations may be combined into a single operation.

Figure 5:
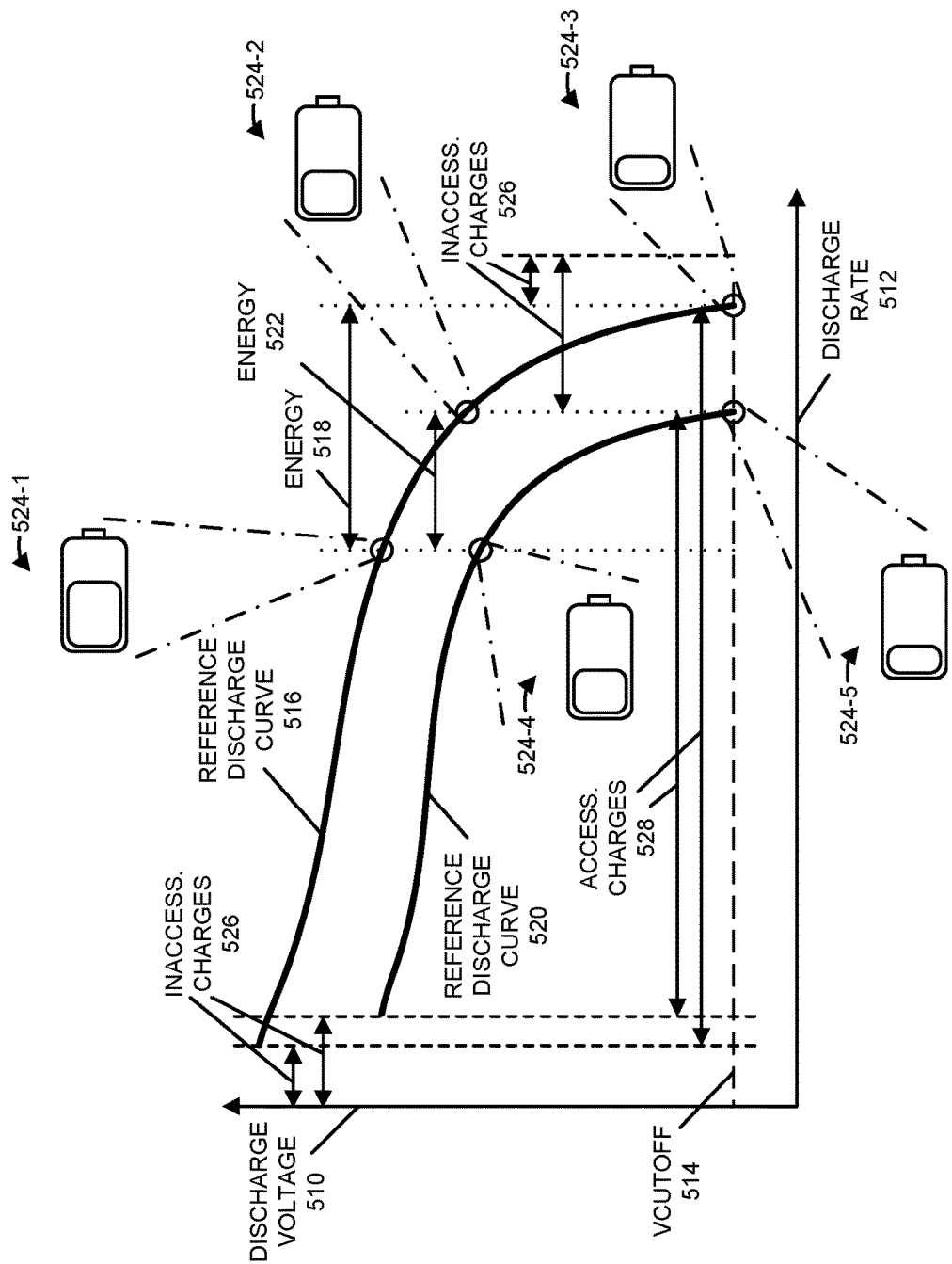
FIG. 5 is a drawing illustrating an example of a discharge voltage as a function of discharge rate of a battery in the portable electronic device of FIG. 3.

We now further discuss the origin of the inaccessible charge. FIG. 5 presents a drawing illustrating an example of a discharge voltage 510 as a function of discharge rate 512 of a battery in a portable electronic device, such as portable electronic device 300 (FIG. 3). In FIG. 5, the cut-off voltage (Vcutoff) 514 determines how much energy is available in a battery. In particular, the energy is proportional to difference between a current capacity and a discharge rate related to cut-off voltage 514. As shown in FIG. 5, this depends on the operation, where reference discharge curve 516 illustrates low or moderate operating conditions (such as moderate temperature or load) and reference discharge curve 520 illustrates extreme operating conditions (such as low temperature or very high load).

Note that the difference in reference discharge curves 516 and 520 may reflect the polarization loss associated with low temperature and/or high discharge current. Stated differently, the difference in reference discharge curves 516 and 520 may be associated with changes in the impedance of the battery (and other battery components). For example, in general the impedance of the battery increases as the battery/device temperature decreases toward colder temperatures. Thus, when the portable electronic device is located in a geographic climate or environment with a low temperature, the impedance of the battery increases.

In reference discharge curves 516 and 520, the corresponding amounts of energy 518 and 522 depend on the power capability of the battery. Note that these available energies displayed or represented by battery-status indicators 524 do change as indicated (i.e., battery-status indicators 524 are accurate). However, as noted previously, this variation can confuse a user that battery charge is changing even without being connected to a charger.

The changes in battery-status indicators 524 are associated with changes in the amount of inaccessible charge of the battery. In particular, there may be inaccessible charge 526 (defined relative to an open-circuit reference discharge curve) both at high states of charge and low states of charge because the impedance of the cell and other battery components. Thus, at low and high values of discharge rate 512, the battery may not be able to discharge to a minimum chemical state of charge because of the impedance of the cell and other battery components. Consequently, the available or accessible discharge capacities or accessible charges 528 may depend on the impedance of the cell and other battery components. Note that, in general, the impedance of the cell and the other battery components may include real and imaginary components, i.e., a resistance and a capacitance.

For example, using the industry standard charge termination criteria of a taper voltage (such as 4300 mV) and a taper current (such as 440 mA), the battery cannot be charged to a point where the open circuit voltage is 4300 mV. As soon as the charging stops, the voltage may drop by the product of the taper current times the impedance. Therefore, because the impedance increases as the temperature decreases, the battery cannot be charged as full at 10 C as at 25 C.

Similarly, the battery cannot be discharged to a point where the open circuit voltage is 3000 mV. As soon as the discharging stops, the voltage may recover by the product of the discharge current times the impedance. Therefore, because the impedance increases as the temperature decreases, the battery cannot be discharged as fully at 10 C as at 25 C.

More generally, the temperature- and/or load-dependent internal cell impedance may affect the amount of accessible charge and the amount of inaccessible charge. For example, the preceding example involved a constant or DC current, in which case the impedance is a resistance. However, in the case of a pulsed load, the capacitance of the cell also impacts the amount of accessible charge and the amount of inaccessible charge.

Note that the preceding example is for illustrative purposes only. Consequently, the numerical values used are intended as non-limiting examples and the feedback technique may be used in conjunction with batteries that have a wide variation in the numerical values.

Figure 6:
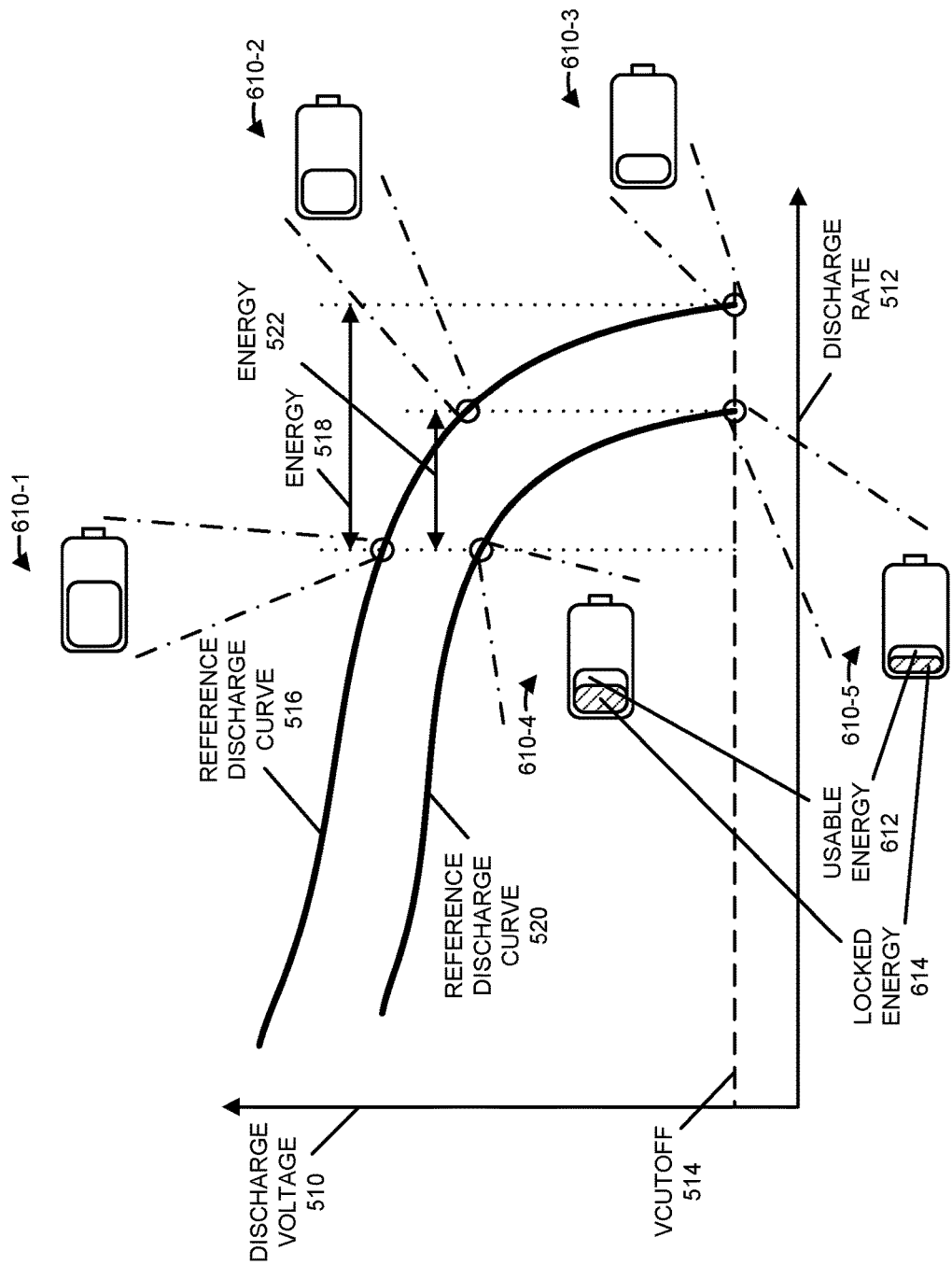
FIG. 6 is a drawing illustrating an example of a discharge voltage as a function of discharge rate of a battery in the portable electronic device of FIG. 3.

Using the feedback technique, the confusion that can occur because of the variation or changes in the battery-status indicator may be reduced or eliminated. This is shown in FIG. 6, which presents a drawing illustrating an example of a discharge voltage 510 as a function of discharge rate 512 of a battery in a portable electronic device, such as portable electronic device 300 (FIG. 3). In particular, the feedback technique may provide a new way to indicate the battery status for available energy. In contrast with FIG. 5, battery-status indicators 610 show usable energy 612 in addition to 'locked' energy 614 that is currently inaccessible (i.e., the inaccessible charge). Note that locked energy 614 is available if the conditions change, such as: the temperature increases away from, e.g., 0 C; and/or power-heavy applications are closed.

While the available energy is exactly same as in FIG. 5, the way the information is communicated is different, so the user no longer see battery magically getting charged without being connected to charger. Moreover, the information about 'locked' energy 614 can enable the user to modify power usage for improved performance.

The locked energy or inaccessible charge indicator may appear at extreme low temperatures (such as at or near 0 C) and/or extreme power-hungry loads (e.g., high current loads or applications). For example, the locked energy indicator may not appear until the amount of inaccessible charge is greater than some threshold, e.g., 5 or 10%.

Figure 7:
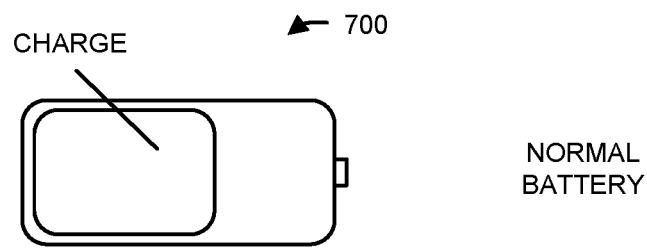
FIG. 7 is a drawing illustrating an example of a displayed battery status of the portable electronic device of FIG. 3.
Figure 8:
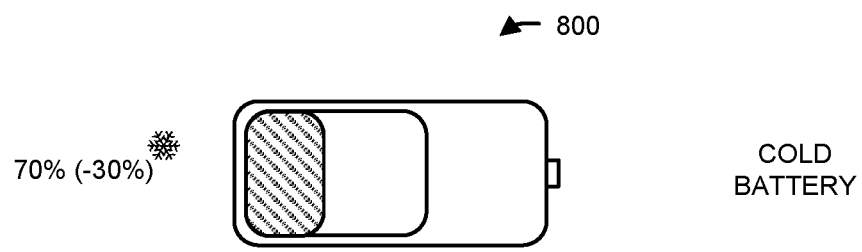
FIG. 8 is a drawing illustrating an example of a displayed battery status of the portable electronic device of FIG. 3.

Note that, using control logic, the locked energy may be classified as cold-related or power-hungry related. This is shown in FIGS. 7-9, which present drawing illustrating examples of a displayed battery status of a portable electronic device, such as portable electronic device 300 (FIG. 3). In particular, FIG. 7 illustrates battery-status indicator 700 that represents the total charge of a 'normal' battery (when the environmental condition is not present), while FIGS. 8 and 9, illustrate battery-status indicators 800 and 900, respectively, that represent the inaccessible charge, the accessible charge and the total charge of a cold battery and loaded battery. Note that the inaccessible-charge indicators or icons shown in FIGS. 8 and 9, respectively, may only be displayed when the environmental condition is present (such as when the temperature is low enough and/or the load is large enough).

In some embodiments, numerical values are presented or displayed along with the icons. For examples, the numerical values may be displayed adjacent to or proximate to the icons. Thus, at extremely cold temperatures, the locked energy may be shown as negative number. Moreover, a cold symbol indicator (such as snowflake) may be used. In addition, the icon or indicator may be colored (such as blue or red) to indicate cold.

Similarly, at extremely heavy loads (e.g., more than 1 A of discharge current), the locked energy may be shown as negative number. Moreover, a power lightning symbol may be used. In addition, the icon or indicator may be colored (such as red) to indicate the heavy load.

Figure 10:
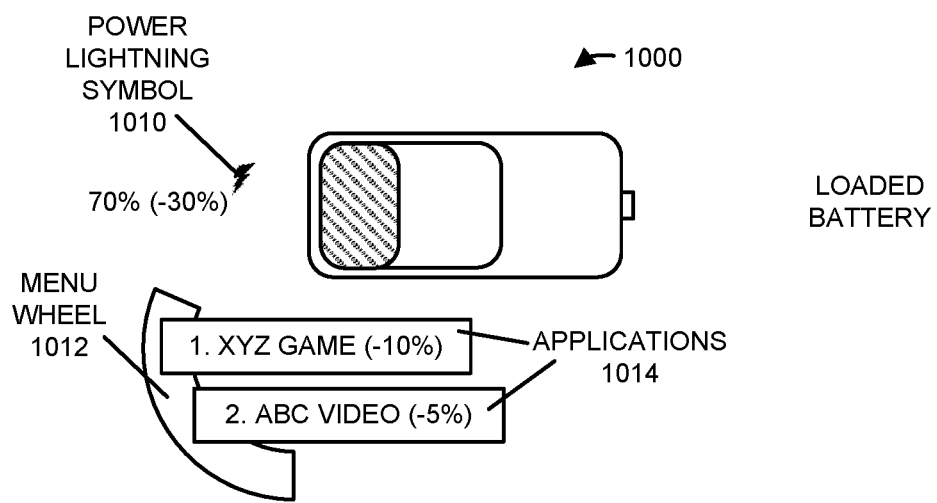
FIG. 10 is a drawing illustrating an example of a displayed battery status of the portable electronic device of FIG. 3.

In some embodiments, the feedback technique is used to provide additional information to the user, such as in response to a user input requesting or instructing the portable electronic device to display the additional information. This is shown in FIG. 10, which presents a drawing illustrating an example of a displayed battery status of a portable electronic device, such as portable electronic device 300 (FIG. 3). In particular, when there are extremely heavy loads, batter-status indicator 1000 may be displayed. As was the case in FIG. 9, the locked energy may be shown as negative number, the power lightning symbol 1010 may be shown and/or the color may be red to indicate heavy load. In addition, when the user clicks on power lightning symbol 1010 (or a strike or contact area on a touch-sensitive display associated with power lightning symbol 1010), a menu wheel 1012 with, e.g., the top-N applications 1014 that are power-hungry and causing locked energy may be displayed. If the user clicks on one of the displayed program names, the associated application may be closed, thereby releasing some locked energy. To assist the user's decision making, numerical values of the amount of locked energy or inaccessible charge may be displayed adjacent or proximate to applications 1014, such as the amount of locked energy in negative percent.

Note that the calculation of the locked energy may require that the portable electronic device compute the energy and not just the charge. The energy may be closely related to a given reference power. As noted previously, the average power consumption of an application may be determined dynamically or may be predetermined and stored, e.g., in a look-up table. Note that the calculations may be adapted based on user behavior.

While the preceding discussion illustrated the use of the feedback technique with the accessible charge and the inaccessible charge, in other embodiments the feedback technique may be used to depict capacity fade.

We now further describe embodiments of the portable electronic device. Referring back to FIG. 3, memory subsystem 312 can include hardware and/or software for controlling access to the memory. In some embodiments, memory subsystem 312 includes a memory hierarchy that comprises one or more caches coupled to a memory in portable electronic device 300. In some of these embodiments, one or more of the caches is located in processing sub system 310.

In some embodiments, memory subsystem 312 is coupled to one or more high-capacity mass-storage devices (not shown). For example, memory subsystem 312 can be coupled to a magnetic or optical drive, a solid-state drive, or another type of mass-storage device. In these embodiments, memory subsystem 312 can be used by portable electronic device 300 as fast-access storage for often-used data, while the mass-storage device is used to store less frequently used data.

Networking subsystem 314 includes one or more devices configured to couple to and communicate on a wired and/or wireless network (i.e., to perform network operations), including: control logic 336, an interface circuit 338 and a set of antennas 340 (or antenna elements) in an adaptive array that can be selectively turned on and/or off by control logic 336 to create a variety of optional antenna patterns or 'beam patterns.' (While FIG. 3 includes set of antennas 340, in some embodiments portable electronic device 300 includes one or more nodes, such as nodes 342, e.g., a pad, which can be coupled to set of antennas 340. Thus, portable electronic device 300 may or may not include set of antennas 340.) For example, networking subsystem 314 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, portable electronic device 300 may use the mechanisms in networking subsystem 314 for performing simple wireless communication between the electronic devices, e.g., transmitting advertising or beacon frames and/or scanning for advertising frames transmitted by other electronic devices. Aside from the mechanisms herein described, radios are generally known in the art and hence are not described in detail. In general, networking subsystem 314 and/or the integrated circuit can include any number of radios. Note that the radios in multiple-radio embodiments function in a similar way to the described single-radio embodiments.

Components in portable electronic device 300 may be coupled together using bus 344 that facilitates data transfer between these components. Bus 344 may include an electrical, optical, and/or electro-optical connection that the subsystems can use to communicate commands and data among one another. Although only one bus 344 is shown for clarity, different embodiments can include a different number or configuration of electrical, optical, and/or electro-optical connections among the subsystems.

Portable electronic device 300 can be (or can be included in) any electronic device with at least one battery. For example, portable electronic device 300 may include: a cellular telephone or a smartphone, a tablet computer, a laptop computer, a notebook computer, a personal or desktop computer, a netbook computer, a music player, a mixed-media playback device, a media player device, an electronic book device, a MiFi® device, a smartwatch, a wearable computing device, a portable computing device, a consumer-electronic device, a wearable device or monitor, a mobile hotspot device, a health monitoring device, as well as any other type of electronic computing device.

Although specific components are used to describe portable electronic device 300, in alternative embodiments, different components and/or subsystems may be present in portable electronic device 300. For example, portable electronic device 300 may include one or more additional processing subsystems, memory subsystems, networking subsystems, and/or display subsystems. Additionally, one or more of the subsystems may not be present in portable electronic device 300. Moreover, in some embodiments, portable electronic device 300 may include one or more additional subsystems that are not shown in FIG. 3. Also, although separate subsystems are shown in FIG. 3, in some embodiments some or all of a given subsystem or component can be integrated into one or more of the other subsystems or component(s) in portable electronic device 300. For example, in some embodiments the one or more program modules 332 are included in operating system 334 and/or control logic 336 is included in interface circuit 338.

Moreover, the circuits and components in portable electronic device 300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of one or more components in portable electronic device 300. This integrated circuit may include hardware and/or software mechanisms that are used for power management in portable electronic device 300.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDSII Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the feedback technique may be implemented using the one or more program modules 332 and/or operating system 334. Alternatively or additionally, at least some of the operations in the feedback technique may be implemented in hardware, such as in power-management subsystem 328.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure.

Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method for displaying a battery status, the method comprising:
at an electronic device:
determining an amount of accessible charge and an amount of inaccessible charge of the battery, wherein the amount of the inaccessible charge is based on at least one of an extrinsic environmental factor comprising an external ambient temperature and a current electronic-device usage factor;
displaying an icon representing the extrinsic environmental factor, when an external ambient temperature is affecting the inaccessible charge; and
displaying a first indication representing the amount of the accessible charge and a second indication representing the amount of the inaccessible charge.

2. The method of claim 1, wherein the battery has a temperature-dependent cell impedance that results in the inaccessible charge.

3. The method of claim 1, further comprising:
displaying an icon representing the electronic-device current usage factor when the current usage factor is affecting the inaccessible charge.

4. The method of claim 2, further comprising:
in accordance with a determination that an external ambient temperature reading, obtained using a temperature sensor of the electronic device, is less than a temperature threshold value, displaying a first icon; and
in accordance with a determination that the current electronic-device usage factor contributing to the inaccessible charge corresponds to a battery discharge rate greater than a discharge threshold value, displaying a second icon,
wherein the first icon is different than the second icon.

5. The method of claim 1, wherein the method further comprises measuring the ambient temperature using a temperature sensor of the electronic device.

6. The method of claim 1, further comprising:
displaying a first numerical value of the accessible charge along with the first indication and a second numerical value of the inaccessible charge along with the second indication.

7. The method of claim 1, further comprising comparing a second numerical value of the inaccessible charge and a first numerical value of the accessible charge, wherein the second indication of the inaccessible charge is displayed based on the comparison.

8. The method of claim 1, further comprising:
receiving a user input representing a request for additional information about the second indication representing the inaccessible charge; and
in response to the user input, displaying one or more applications executing on the electronic device and numerical values of associated inaccessible charges, wherein the inaccessible charge associated with an application is based on current usage of electronic-device resources by the application.

9. An electronic device, comprising:
a battery configured to power the electronic device;
a display configured to display information;
memory, coupled to the battery, configured to store a temperature threshold value and a discharge threshold value; and
a processor, coupled to the battery, the display and the memory, configured to:
determine an inaccessible-charge condition of the battery based on a presence of an environmental condition, the environmental condition including one of: an external ambient temperature less than the temperature threshold value; a discharge rate of the battery greater than the discharge threshold value; and the external ambient temperature less than the temperature threshold value and the discharge rate of the battery greater than the discharge threshold value; and
in response to the inaccessible-charge condition, display, on the display, a first indication of an accessible battery charge, and a second indication of an inaccessible battery charge that is currently unavailable for use because of the environmental condition.

10. The electronic device of claim 9, wherein the processor is further configured to display, on the display, one of a set of icons that represents the environmental condition.

11. The electronic device of claim 10, wherein, when the external ambient temperature is less than the temperature threshold value, a first icon is displayed and, when the discharge rate of the battery greater than the discharge threshold value, a second icon is displayed; and
wherein the first icon is different than the second icon.

12. The electronic device of claim 9, wherein the processor is further configured to display, on the display, a first numerical value of the accessible battery charge along with the first indication and a second numerical value of the inaccessible battery charge along with the second indication.

13. The electronic device of claim 9, wherein the processor is further configured to compare a second numerical value of the inaccessible charge and a first numerical value of the accessible charge, wherein the second indication of the inaccessible charge is displayed based on the comparison.

14. The electronic device of claim 9, wherein the processor is further configured to:
receive a user input representing a request for additional information about the second indication representing the inaccessible charge; and
in response to the user input, displaying one or more applications executing on the electronic device and numerical values of associated inaccessible charges, wherein the inaccessible charge associated with an application is based on current usage of electronic-device resources by the application.

15. The electronic device of claim 9, wherein the battery has a temperature-dependent cell impedance that results in the inaccessible charge.

16. The electronic device of claim 9, wherein the electronic device further comprises a temperature sensor coupled to the processor; and
wherein the processor is further configured to measure the temperature of the battery using the temperature sensor.

17. A non-transitory computer-readable storage medium having computer-executable instructions that, when executed by an electronic device, cause the electronic device to display representations of accessible and inaccessible battery charge, the computer-executable instructions comprising instructions for:
determining an inaccessible-charge condition of the battery based on a presence of an environmental condition, the environmental condition including one of: an external ambient temperature less than a temperature threshold value; a discharge rate of the battery greater than a discharge threshold value; and the external ambient temperature less than the temperature threshold value and the discharge rate of the battery greater than the discharge threshold value; and displaying, on the display, in response to the inaccessible-charge condition, a first indication of a total battery charge, and a second indication of an inaccessible battery charge that is currently unavailable for use because of the environmental condition.

18. The computer-readable medium of claim 17, wherein the operations further include measuring the external ambient temperature using a temperature sensor.

19. The computer-readable medium of claim 17, wherein the operations further include displaying, on the display, one of a set of icons that represents the environmental condition.

20. The computer-readable medium of claim 19, wherein, when the external ambient temperature is less than the temperature threshold value, a first icon is displayed and, when the discharge rate of the battery is greater than the discharge threshold value, a second icon is displayed; and wherein the first icon is different than the second icon.

\* \* \* \* \*